United States Patent Office 3,613,337
Patented Oct. 19, 1971

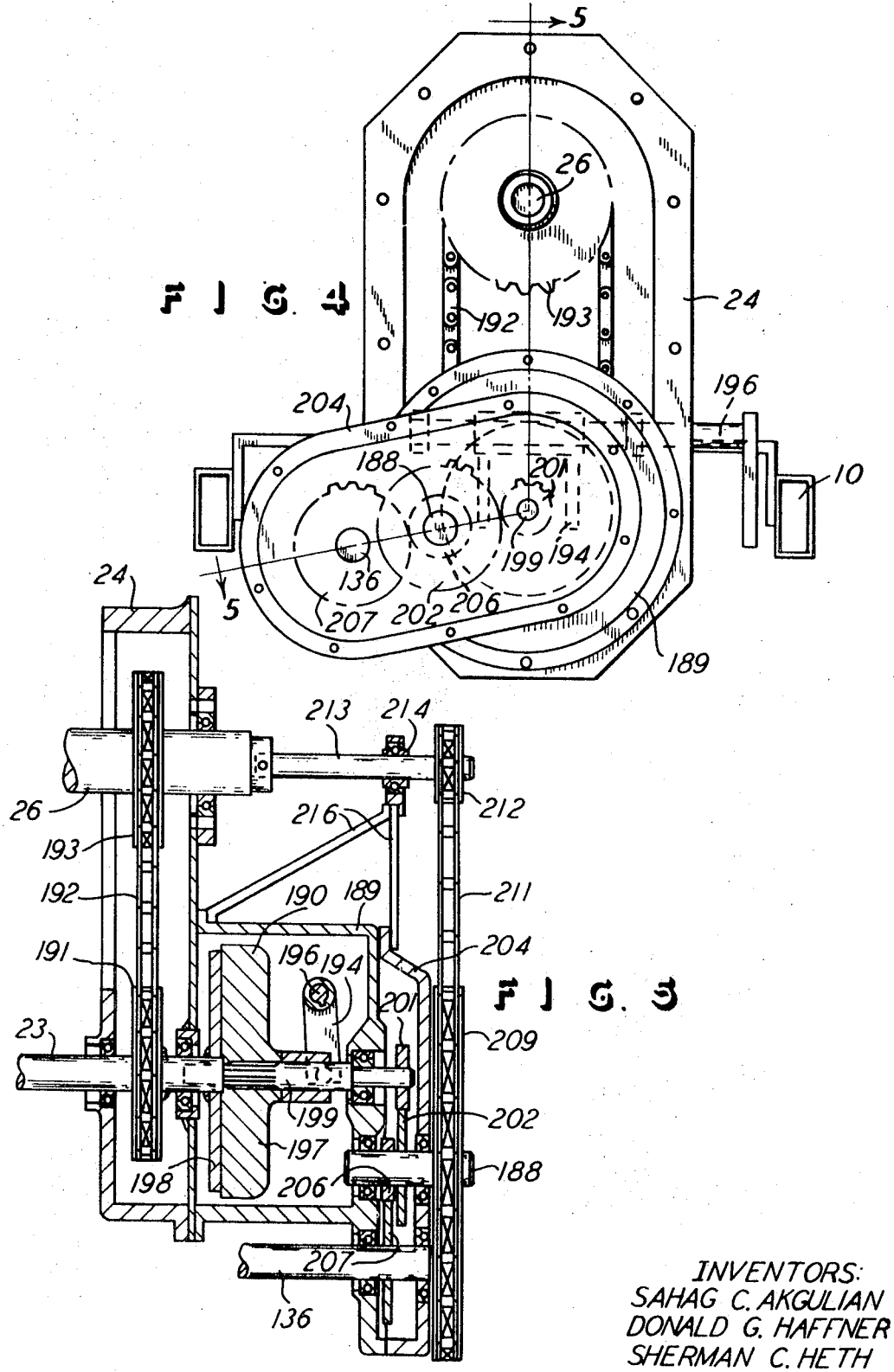

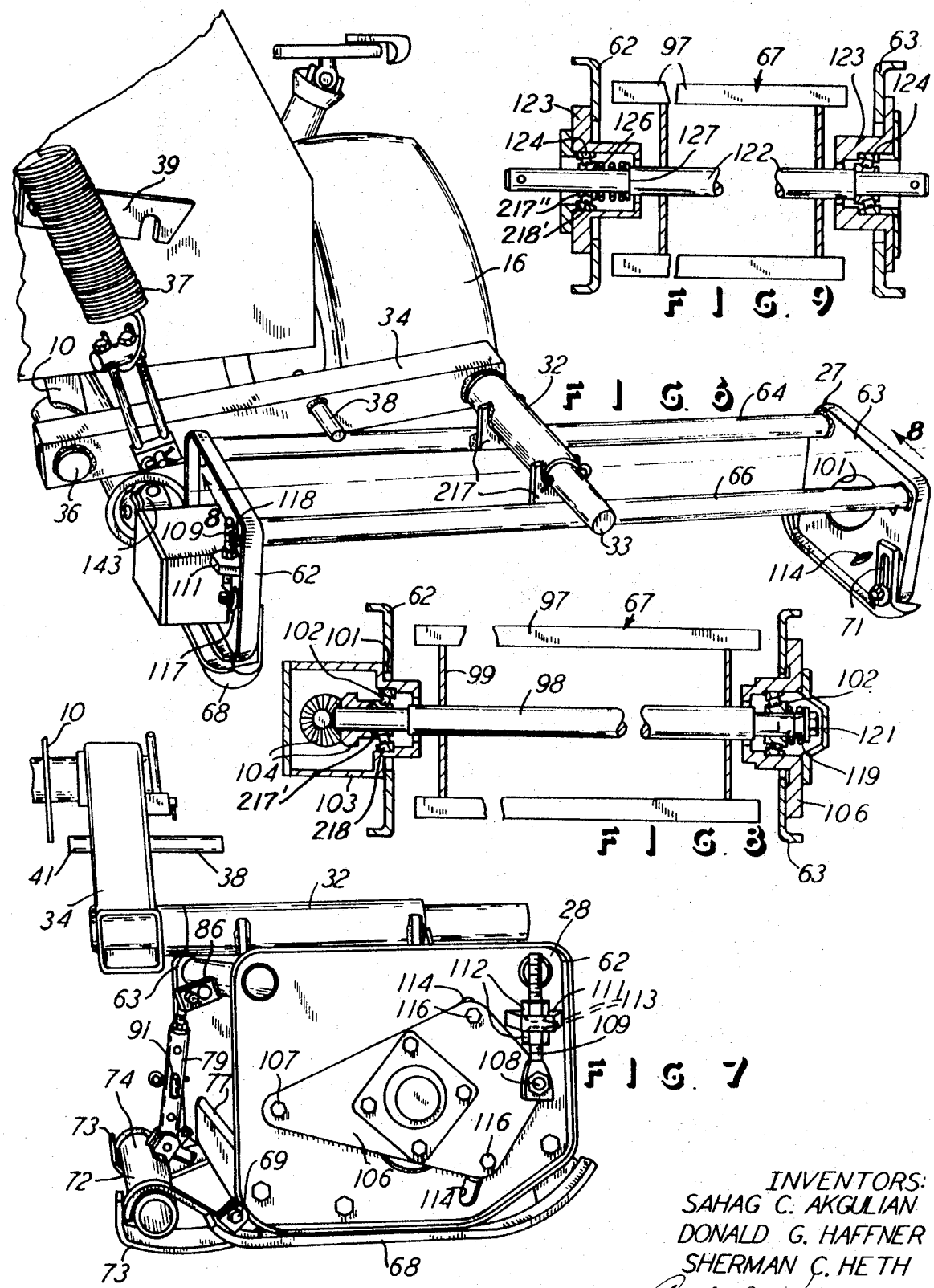

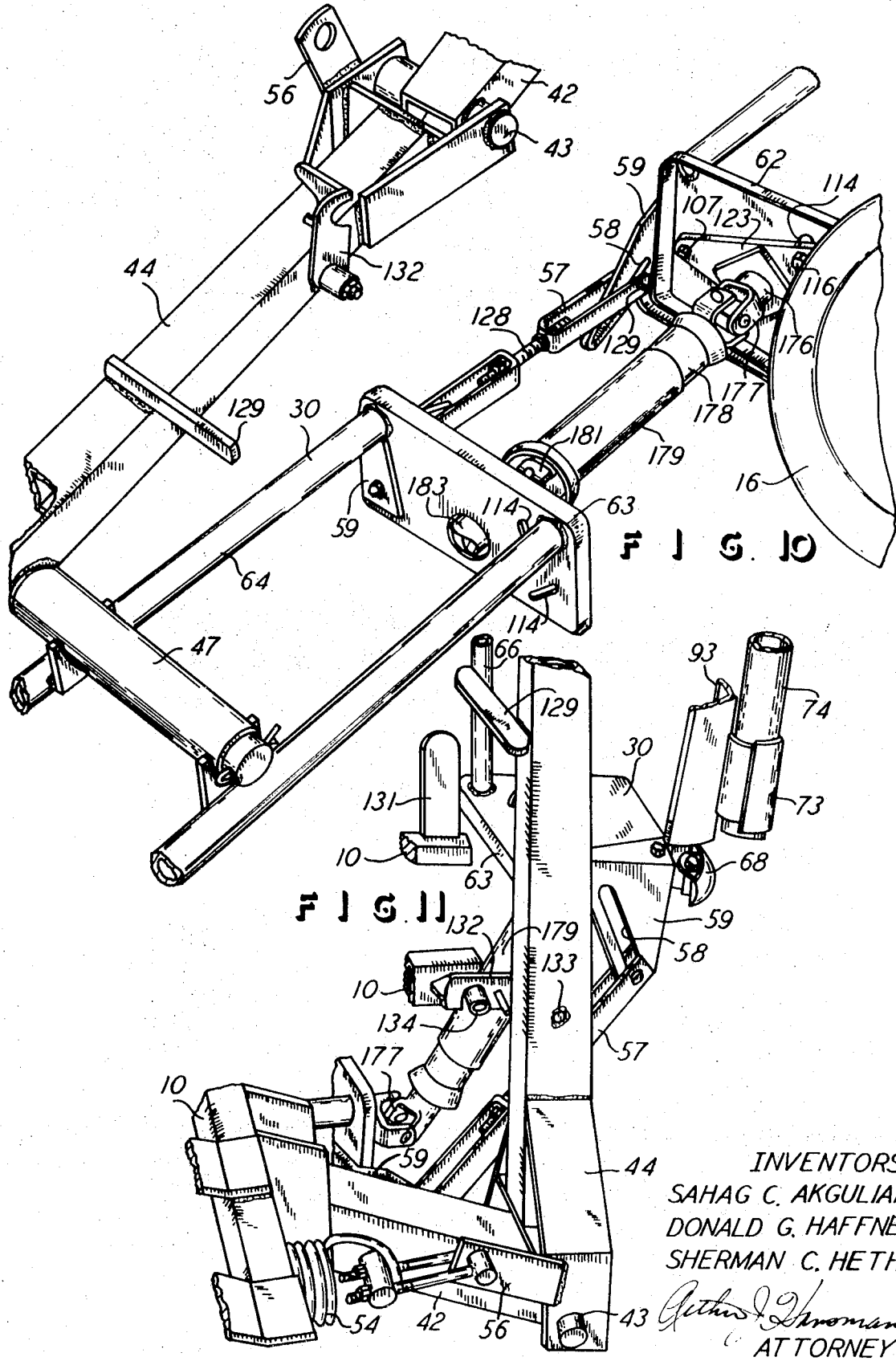

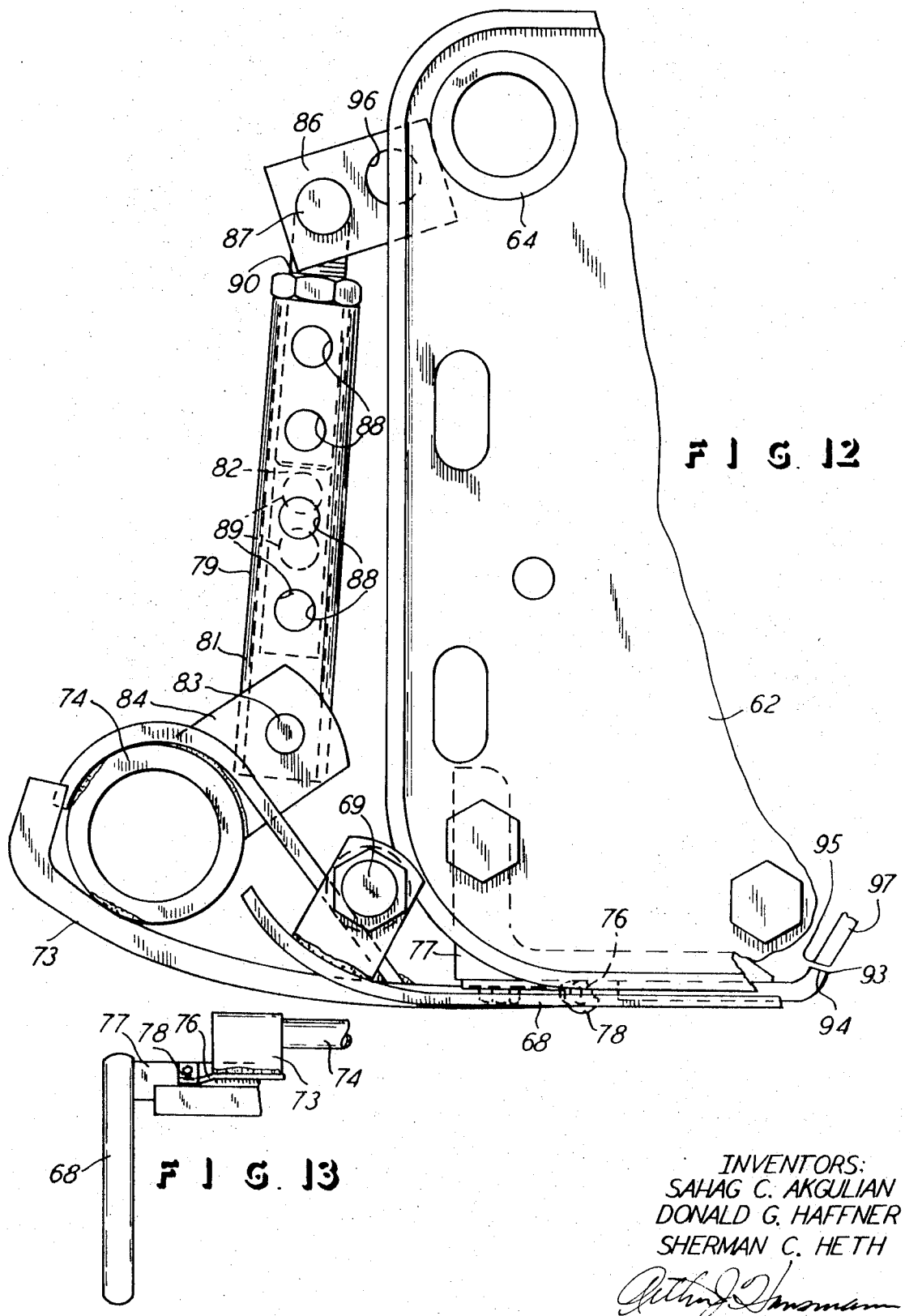

3,613,337
GANG LAWN MOWER
Sahag C. Akgulian, Donald G. Haffner, and Sherman C. Heth, Racine, Wis., assignors to Jacobsen Manufacturing Company, Racine, Wis.
Filed Apr. 9, 1970, Ser. No. 27,065
Int. Cl. A01d 75/30
U.S. Cl. 56—7
11 Claims

ABSTRACT OF THE DISCLOSURE

A tractor including a prime mover and traction wheels and a plurality of lawn mowers. Arms are pivotally mounted on the tractor and the extending ends of the arms pivotally support mowers of the reel type. Each mower is independently and separately pivotally supported, and each mower is driven by a mechanical drive extending from the tractor to the mowers. The mechanical drive is flexible to permit pivotal motion of the mowers, and the mowers can be positioned in a transport position where latches secure the mowers on the tractor. The drive mechanism to the mowers is also extendable in length, to accommodate the mower pivot action, and a limit connector is provided so that the extendable drive mechanism does not come apart upon maximum pivotal motion of the mowers relative to the tractor. A lift connector extends between two of the mowers such that lifting one of the mowers will also cause the other mower to be lifted, and lift springs are provided for assisting of lifting of the mowers and for also positioning the pivot arms in an optimum sturdy position with a minimum of play in the connection to the tractor. Abutment surfaces are provided on the tractor and the mowers for limiting the pivot of the mowers in both the mowing position and the transport position.

---

This invention relates to a gang lawn mower, and, more particularly, it relates to a tractor having a prime mover for powering the tractor, and with a plurality of lawn mowers pivotally mounted on the tractor and powered by the tractor prime mover.

BACKGROUND OF THE INVENTION

The prior art is already aware of gang lawn mowers wherein the mowers are pivoted on a tractor and are powered by the prime mover of the tractor. Such prior art mowers are of the nature shown in U.S. Pat. 3,106,811 which also shows the utilization of U-joints and bevel gears in providing the drive mechanism from the tractor to the mowers. Another example of a prior art gang lawn mower structure is found in U.S. Pat. 3,248,864 which shows a mower support arm extending laterally of the tractor and providing a fore-and-aft shaft and sleeve combination pivotally connected to the mower for pivotal support of the mower.

The differences between prior art gang mowers and the present disclosure of a gang mower are several in number, and they include the provision of pivotally mounted mowers which are independently and separately pivotally mounted, without dependence upon each other for their support and connection relative to the tractor. Also, the differences include the fact that the present disclosure is of a structure wherein the mowers have a mechanical type of drive extending to each mower so that the mowers may be positively driven by the mechanical drive, and also the mowers are completely free for the desired pivotal action, even though a mechanical drive extends to each mower.

Still further, the present invention discloses an improved gang mower in that it includes a simplified, convenient, and yet expedient means for raising any one or all of the mowers to the transport position, without requiring elaborate connections which include power lift means such as hydraulic cylinders. Still further, the mowers are completely articularly mounted relative to the tractor, but the mower precision is not in any way hampered by loose or uncontrolled pivot joints. In accomplishing the latter mentioned feature, lift springs are arranged to assist in the lifting of the mowers, and the springs are also arranged to provide the optimum security in the pivot connection of the mower pivot arms.

Still further, the present invention has an arrangement for pivotally supporting the mowers in a manner where any end-to-end weight unbalance of the mowers is compensated for by the support of the mowers. Also, provision is made for controlling the limit of pivot of the mowers, and thereby controlling the support of the mowers in the transport position and thereby also protecting the mechanical drive extending to the mowers.

Still further, the present invention discloses a gang mower structure wherein the mowers are pivotally supported on the tractor and are powered through a mechanical drive train, and the mowers are supported on the ground by skids, rather than wheels and rollers, so the skids provide for optimum positioning of the mowers relative to the contour of the ground, including anticipating rises in the ground to avoid scalping.

Other objects and advantages will become apparent upon reading the following disclosure.

BRIEF DESCRIPTION OF THE DRAWINGS

FIG. 4 is an enlarged rear elevational view of a portion of FIG. 1.

FIG. 5 is a sectional view taken on the line 5—5 of FIG. 4, and with parts added thereto.

FIG. 6 is a front perspective view of a portion of FIG. 1, on an enlarged scale.

FIG. 7 is a side perspective view of a portion of FIG. 1, on an enlarged scale.

FIG. 8 is a sectional view taken on the line 8—8 of FIG. 6.

FIG. 9 is a sectional view similar to FIG. 8, but showing a different mower.

FIG. 10 is an enlarged perspective view of a fragment of FIG. 1, and with the view being taken from the front right side of the machine of FIG. 1.

FIG. 11 is a rear perspective view of FIG. 10, with parts added thereto and with parts removed, and with the parts shown in their raised or transport position.

FIG. 12 is an enlarged side elevational view of a fragment of the mower shown in FIG. 1.

FIG. 13 is a bottom plan view of FIG. 12, on a reduced scale and showing a fragment thereof.

DETAILED DESCRIPTION OF THE PREFERRED EMBODIMENT

Figure 1:
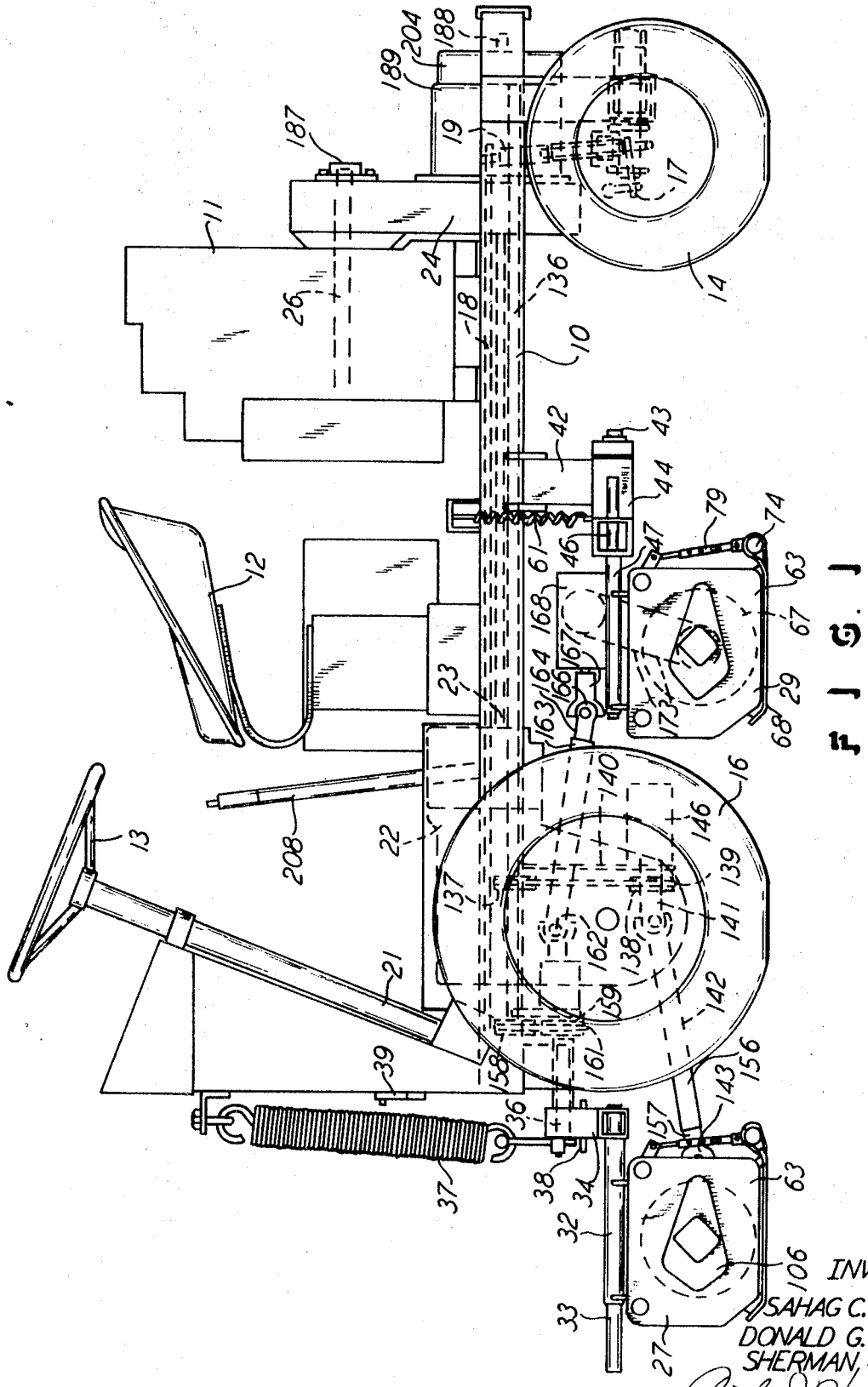
FIG. 1 is a side elevational view of a gang lawn mower having a preferred embodiment of this invention.

A tractor frame 10 supports an engine 11, an operator's seat 12 and a steering wheel 13. Two rearwardly mounted ground wheels 14 and two forwardly mounted ground wheels 16 are also included in the tractor. The rear wheels 14 are the steering wheels which are controlled by steering arms 17 suitably connected to a steering rod 18 extending between the upright rear wheel connector 19 and the steering column 21. The front wheels 16 are the powered or traction wheels, and they are shown to be driven through a hydraulic unit designated 22 which is powered through a rod 23 extending between the unit 22 and a box 24. The engine 11 has a shaft 26 extending to the box 24, and a suitable sprocket and chain drive extends in the box 24 from shaft 26 and connects to the rod 23 for powering the hydraulic unit 22 which in turn drives the front traction wheels 16.

Figure 2:
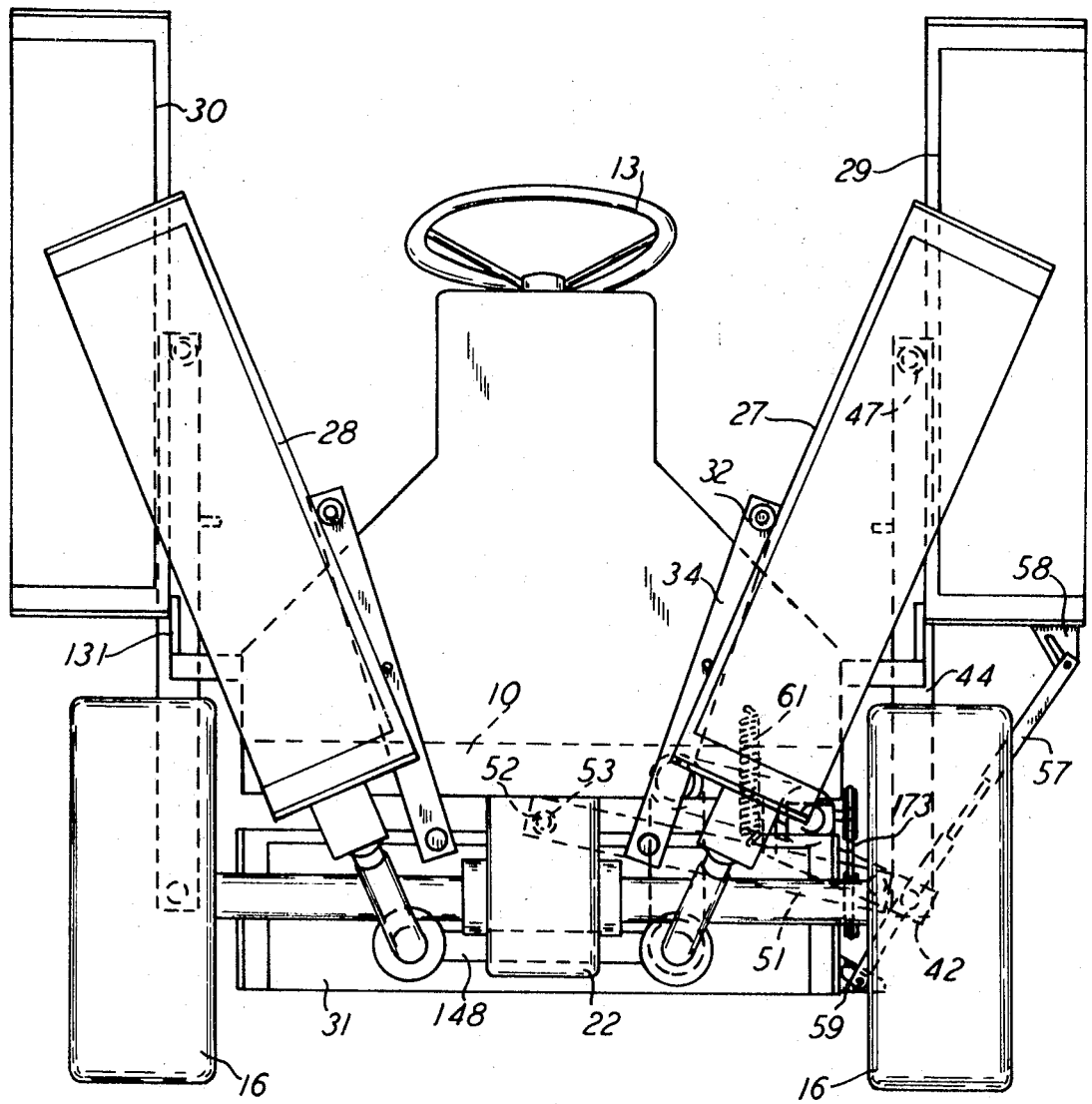
FIG. 2 is a front elevational view of FIG. 1, but with the mowers in the raised and transport position.
Figure 3:
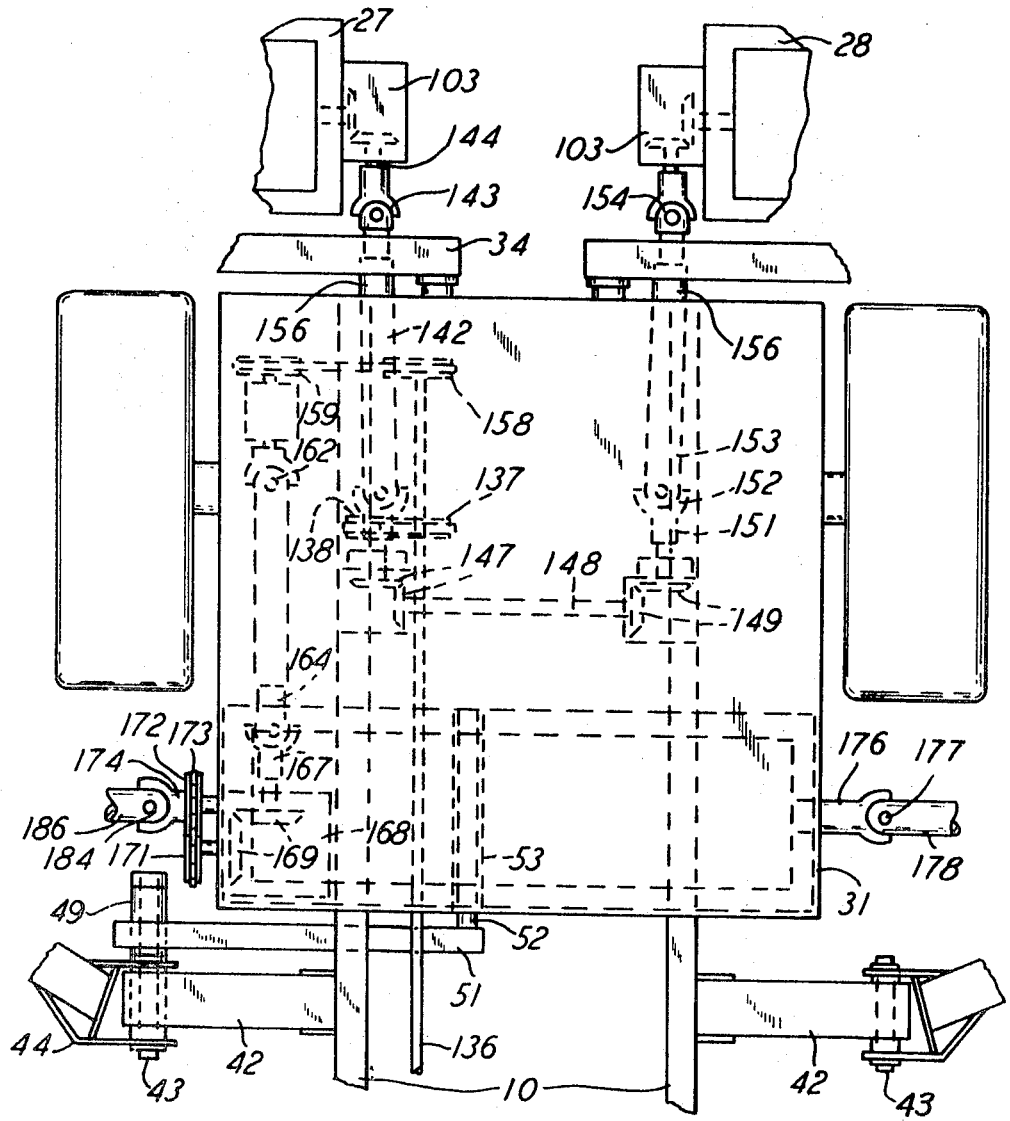
FIG. 3 is a top plan view of a central portion of FIG. 1.

Five reel type lawn mowers are powered by the prime mover 11 and are pivotally supported on the tractor or its frame 10, and such mowers are the two front mowers 27 and 28 and the two side or wing mowers 29 and 30 and the center mower 31, all five of which are shown in FIGS. 2 and 3.

The front mowers 27 and 28 have a sleeve 32 which telescopically receives a shaft 33 attached to a pivot arm 34 pivotally mounted on a pin 36 on the tractor frame 10. A tension spring 37 is connected to the arm 34 and the tractor 10 and is therefore available for transferring some of the weight of the front mower to the tractor, and there is a spring 37 for each of the two front mowers 27 and 28. Also, arm 34 has a pin 38 which swings into the path of the position of a latch 39 on the tractor 10, and the pin end 41 is engaged by the latch 39 to hold the front mower in the raised position of FIG. 2. FIG. 6 shows the front view of the latch 39, and the operator would simply grip the forwardly projecting end of the pin 38 and lift the front mower into the latched position described.

Wing mowers 29 and 31 are pivotally supported on the tractor 10 through a support arm 42, rigid with the tractor frame 10 for providing a pivot shaft 43 for each respective one of the wing mowers 29 and 30. Thus, a pivot arm 44 is pivoted on the shaft 43 and carries a shaft 46 which is telescoped in a sleeve 47 secured to the wing mower.

The center mower 31 is also pivoted on the tractor 10, and it has a shaft 43 supported on the frame arm 42 and telescopically received within a sleeve 49. A mower pivot arm 51 extends from a connection with the sleeve 49 and to a shaft 52 telescopically received within a sleeve 53 affixed to the mower 31.

FIGS. 2, 10, and 11 show that the wing mowers 29 and 30 and the center mower 31 are pivotal to the transport position and are connected together for raising the mowers. The operator can lift the wing mowers 29 and 30, and each mower has a tension spring 54 connected to the mower pivot arm 44, through a plate 56, and connected to the tractor 10, in any suitable manner. The wing mowers and center mower are connected through an adjustable linkage 57, the opposite ends of which are slidable in slots 58 in plates 59 mounted on each of the two wing mowers and on the center mower. FIG. 2 shows that when the wing mower 29 is raised, the linkage 57 forces upwardly on the bracket 59 on the center mower 31 to raise the center mower to the position shown in FIG. 2. A similar linkage 57 and two brackets 59 connect between the right wing mower 30 and the right side of the center mower 31 to lift the right side of the center mower also.

A tension spring 61 is connected between the tractor 10 and the center mower lift arm 51 for taking some of the weight of the center mower 31.

The structure of each of the five mowers is identical and includes the two side plates 62 and 63, as shown in FIG. 6. Mower frame tubes 64 and 66 are connected between the side plates 62 and 63, and the mower respective sleeves, such as the sleeve 32, are secured to the cross-tubes 64 and 66. Reels 67 are rotatably mounted between the side plates 62 and 63 in a manner described later. Each side plate of the mower has a skid-shoe 68 vertically adjustably secured to the plate by means of a pivot bolt 69 and a slot 71 in the shoe 68. Also, a skid assembly 72 is included in the mower and is pivotal thereon and has two rear skids 73 and an intermediate torque tube 74 secured to the rear skids 73. FIGS. 12 and 13 show the rear skids 73 are pivotal on the mower by means of an arm 76 affixed to the shoe 73 and held to the mower bed knife 77 through a bracket 78. Thus the arm or rod 76 is pivotal in the bracket 78 for moving the rear skids 73 up and down and thereby adjusting the elevation of the mower, along with the adjustment of the skid-shoe 68. To position the skid 76, an adjustable connector 79 extends between the mower tube 64 and the torque tube 74. The connector 79 consists of two telescoping sleeves 81 and 82. Outer sleeve 81 is connected to the torque tube 74 through a pin 83 and ears 84 which are affixed to the tube 74. Also, sleeve 81 is connected to the mower tube 64 through ears 86 on the tube 64 and an angled pin 87 which is threaded into the inner sleeve 82. Sleeves 81 and 82 both have a series of holes, namely, 88 and 89, respectively, and these holes can be matched in aligned pairs for receiving a locking pin 91, as shown in FIG. 7. With the four holes 88 in sleeve 81 and the three holes 89 in sleeve 82, there are twelve different pin positions possible for setting the elevation of the skids 73. Further, the angle pin 87 is threaded at 90 and into inner sleeve 82 so that an additional adjustment in elevation is possible by virtue of the threaded arrangement described.

It will therefore be seen that each mower has a bed knife 77 for presenting a cutting edge 93 on the angled surface 94 which is presented to the reel 67. The knife 77 is secured to the mower side plates 62 and 63, but the reel 67 can move toward and away from the knife 77, for the desired adjustment. Thus, the side skid 68, and the rear skid assembly with shoes 73, support the mowers on the ground such that the rear skids 73 normally hold the mowers in the mowing position, and the side skids 68 are available for further upwardly supporting the mowers if they meet a rise in the ground. Also, the tube 74 extending across the width of each mower is available for suspending an end of the mower over a rise in the ground or a curb or the like, and the tube 74 would then function as a torque tube to transfer the support from the shoe 73 which is on the ground and to the opposite side of the mower. Therefore, FIG. 12 shows the skidshoe adjustment with the tube 74 in the maximum upward position and therefore it would be understood that the lowest holes 88 and 89 are aligned and secured by pin 91, as indicated in FIG. 7. Further, plate 86 has a hole 96 which can also receive the upper end of the angle shaft 87, so a further elevational adjustment is available. With this arrangement, all mowers can be readily but very accurately placed in the same mowing elevation. The reels have cutting edges 95 which are sharpened.

Particularly FIGS. 6 through 9 show the mower construction with the arrangement and the mounting of the reel 67 having the usual plurality of cutting blades 97, shaft 98 and support plates 99, all rotatably mounted for cutting rotation. Thus, end plates 62 and 63 have large openings 101 which provide for the passage of the opposite ends of reel shaft 98 and which accommodate reel bearings 102. A gear box 103 is shown on the plate 62 in FIGS. 6 and 8 which show the front mower 27. Bevel gears 104 are at right angle relation in the box 103, for driving the reel 67 from a drive train described later. A bearing support member 106 is suitably supported on mower side plate 63 for supporting the adjacent end of the reel shaft 98.

FIG. 7 shows the right front mower 28, and it shows the bearing support member 106 which is pivoted to the side plate 62 at the mounting bolt 107. A bolt 108 connects the forward end of the member 106 with an upright adjusting screw 109 which is anchored on the plate 62 by a fixed bracket or plate 111. Upper and lower adjusting nuts 112 connect the screw 109 with the plate 111 to set the vertical position of the screw 109 and therefore the vertical position of the connecting stud 108 with the member 106. Also, the nuts 112 are shown to have conically shaped inner ends 113, so they fit tightly in the conically upper and lower pockets on the plate 111 which snugly receives the conical portions 113 of the nuts 112, regardless of the angle of the extension of the screw 109 through the plate 111, according to the adjustment for the member 106. Further, mower side plate 62 has adjusting slots 114 which accommodate the mounting bolts 116 extending through the member 106 and through the slots 114 of the side plate 62. With the arrangement described, bolts 107 and 116 and stud 108 can be loosened, and nuts 112 can be loosened and adjusting screw 109 can be moved up and down by re-positioning the nuts 112 on the screw 109. This of course adjusts the vertical position of the reel shaft 98 at its end adjacent the mounting member 106, so the reel blades 97 are adjusted relative to the bed knife edge 93.

FIG. 6 shows that the gear box 103 is also vertically adjustable, just as described in connection with the mounting member 106, and again the adjusting screw 109 is secured on the plate 111 on motor side plate 62, and the box 103 has a boss 117 which connects with the lower end of the screw 109, and the box 103 also has a boss 118 which receives a mounting bolt extending through the plate 62, just as the bolts 116 extend through the mounting member 106. Further, the box 103 has a pivot bolt similar to the bolt 107, so, as clearly indicated and described, the box 103 is also vertically adjustable, just as the mounting member 106 is vertically adjustable. Further, both adjusting screws 109 have the conically shaped nuts 112 which are ultimately tightened against the plates 111 and into the conically shaped pockets in the plates 111, so that the nuts 112 are snug with the plates 111 and therefore the adjusting screw 109 is securely fixed for the critical and accurate adjustment desired, and this arrangement of conical nuts 112 exists on both ends of the mower. Therefore, both ends of reel shaft 98 are vertically adjustable relative to the bed knife 77, and such adjustment exists on all five mowers.

FIG. 8 shows mower 27 has a compression spring 119 applied between the bearing 102 and a washer 121 affixed to the end of the reel shaft 98. Thus the spring 119 urges the reel 67 to the right, as viewed in FIG. 8, and this is the direction which the normal and conventional spiral of reel blades 97 would also urge the reel 67 in the function of mowing. Then, if the reel 67 hit debris, the spring 119 would permit the reel blade 97 to accommodate the hitting of the debris as the reel 67 moves to the left, as viewed in FIG. 8, against the pressure of spring 119. This of course means that the gear 104 on shaft 98 would slightly adjust its position relative to the other gear 104, but the reel blades 97 would be protected from damage of hitting the debris.

FIG. 9 shows the center mower 31 with its reel 67 and blades 97, and this mower has a shaft 122 extending through mounting members 123 and bearings 124, as shown. In this center mower, a compression spring 126 acts against the shaft shoulder 127 and the bearing 124 to again urge the reel 67 in the same direction that the spiraled blades 97 of the reel 67 are urged in the normal course of mowing and in the normal action of the blades 97 against the bed knife 77, as is commonly known. However, when the blades 97 hit debris, then the spring 126 permits the blades 97 to become somewhat released relative to their movement toward the bed knife 77 and toward the debris thereon, so again the reel 67 is protected from damage.

FIG. 10 shows the right-hand end of center mower 31, and it shows mower plate 62 and mounting member 123 with the upper adjusting slot 114 which accommodates the mounting bolt 116. The pivot bolt 107 is also shown, all as described in connection with FIG. 7 and mower 28 relative to the vertical adjustment of the reels 67 to their respective bed knives 77. Of course the other mounting member 123 on center mower plate 63 is also vertically adjustable, as shown in connection with the one shown plate 123 in FIG. 10. It will also be understood that the wing mowers 29 and 30 have adjusting mounting members 123, and FIG. 10 shows the adjusting slots 114 for accommodating the mounting member 123 on the plate 63 of the wing mower 30. The mounting member 123 would also be on the plate 62 of the wing mower 30, and the same arrangement would be provided on the wing mower 29.

FIGS. 10 and 11 further show the mounting of the wing mower, the pivot thereof, and the connection between the center mower 31 and the wing mower 30, which connection is similar to the connection between the center mower 31 and the wing mower 29. Thus FIG. 10 shows the mowers down in the mowing position, and it will be seen that the linkage 57 has an adjusting screw 128 for adjusting the length of the linkage 57 and thereby adjusting the connection between the center mower and the wing mowers. Also, the linkage pin 129 is shown slidable in the bracket slot 58, and the other end of the linkage 57 would likewise be slidable in the slot 58 of the bracket 59 on the wing mower.

When the wing mower is lifted manually, the spring 54 is available for assisting the lifting, and the mower tube 66 abuts an arm 129 on the pivot arm 44. This abutment keeps the wing mower in the desired attitude as it is being raised, so the mower on its plate end 63 cannot swing upwardly beyond the arm 129. Also, because of linkage 57, the mower plate 63 cannot swing excessively away from the arm 129, with both swing directions being relative to the mounting sleeve 47. Thus, the arm 44 is pivoted to the upright position of FIG. 11, which is the transport position also shown in FIG. 2. When the wing mower is in the position of having its reel axis vertical, the mower plate 63 is then in abutment with a projection 131 on tractor frame 10, as shown in FIG. 11. Here again, link 57 prevents the wing mower from overtipping about the sleeve 47, and the wing mower is therefore held in a secured position by means of the link 57 and the tractor frame abutment piece 131. In the raised position, a latch 132, pivotally mounted on the pin 133 on arm 44 engages a pin 134 on tractor frame 10, to hold the wing mower in the transport position by virtue of holding the arm 44 on its pivot shaft 43.

In the FIG. 2 and FIG. 11 position, the linkage 57 has pulled upwardly on its respective connected end with the center mower 31, so the center mower is then also in the raised or transport position, as shown in FIGS. 2 and 11. The center mower raising was also assisted by the heretofore described spring 61 connected between the tractor 10 and the arm 51 which mounts the center mower 31.

FIGS. 1 through 5 show the drive train for powering the five mowers. A drive shaft 136 is driven by the engine 11, in a manner described later, and it extends to a forward location on the tractor 10 where the shaft 136 is suitably rotatably supported on the tractor 10 and carries a sprocket 137. A drive chain 138 is on the sprocket 137 and is connected to a lower sprocket 139 which may be on a universal joint shaft 141 suitably rotatably mounted on a plate 140 on the frame 10. Universal joint shaft 141 connects to a forwardly extending universal joint shaft 142 which terminates in a universal joint connection 143 connected to a shaft 144 extending into gear box 103 for driving the front mower 27. Also, a right-angle gear box 146 is suitably supported on the frame 10 and contains bevel gears 147 which drive shaft 148 extending over to bevel gears 149. Gears 149 in turn drive a universal joint shaft 151 connected through a universal joint 152 to a shaft 153 extending forwardly to a universal joint 154 which drivingly connects with gear box 103 of front mower 28. With this sprocket and universal joint drive described, the front mowers 27 and 28 are powered and are driven at the same and controlled speed. Also, with the universal joints extending in pairs to each of the front mowers 27 and 28, the drive train described permits the pivotal action of the mowers, both during mowing and when raising the mowers 27 and 28 to the transport position shown in FIG. 2.

FIG. 1 shows that the shaft 141 is located so that the mower 27 can swing up and down about a substantially central pivot point as determined by the vertical location of shaft 141. However, the shaft 142 is a spline type drive having two telescoping sections 156 and 157, to permit the necessary variation in the length of the shaft 142 from the rear universal joint thereon to the forward universal joint 143. It will also be noted that the mower mounting sleeve 32 is offset relative to the fore-and-aft axis of the front mowers 27 and 28, respectively, so that the sleeve 32 is toward the gear box 103 on each respective mower. Therefore, in the mowing function and in the transport position shown in FIG. 2, the mowers 27 and 28 will be over-balanced so that they abut the stop pin 38, as shown and as desired. Further, the mowers 27 and 28 should not swing about the sleeve 32, in a direction to have their respective gear boxes 103 move downwardly in FIG. 2. This assures that the spline drive shafts 142 and 153 will not come apart. Still further, the spline drives or shafts 142 and 153 are actually limited in their outer lateral movement, in the event the mowers were to swing as just described, and such limit is because the splined shafts 142 and 153 would abut the tractor front wheels 16, if the mowers 27 and 28 were to swing to that extent and about their respective sleeves 32.

Continuing to trace the drive train to the mowers, the two wing mowers, and the center mower are driven by the drive shaft 136 through a sprocket 158 which drives a lower sprocket 159 through a chain 161. A universal joint 162 is driven by sprocket 159 and a first spline shaft 163 slidably telescopically connects to a second spline shaft 164 which, through a universal joint 166 and a shaft 167, extends into a gear box 168 mounted on one end of the center mower 31. Two bevel gears 169 are thus driven in the box 168 and they drive a sprocket 171 which drives a sprocket 172 through the chain 173, so that a universal joint shaft 174 is rotatably driven. The shaft 174 is suitably rotatably mounted on the center mower 31, in a manner similar to that shown and explained with regard to a shaft 176 on the right end of mower 31 and shown in FIG. 10.

Universal joint shaft 174 and 176 are conventionally and appropriately connected to opposite ends of the center mower reel shaft 122, so that all rotate together. FIGS. 3, 10 and 11 when viewed together, then show that universal joint shaft 176 has a universal joint 177 connected to a first spline shaft 178 which in turn is telescopically splined with a second spline shaft 179. Shaft 179 has a connection to a universal joint 181 which in turn has a shaft 183 which is suitably connected to the mower reel shaft of the center mower, and which may be shown as shaft 183 in FIG. 10. Similarly, universal joint shaft 174 connects to a universal joint 184 which in turn connects to a first spline shaft 186 extending toward the wing mower 29 and being drivingly connected to the reel 67 of the wing mower 29, in the manner described in connection with wing mower 30 as seen in FIG. 10.

With the drive described, all of the five mowers are driven at a controlled and identical speed. Further, it will be seen in FIG. 3 that the center mower support or mounting sleeve 53 is offset toward the left, as viewed in FIG. 3, relative to the longitudinal axis of the center mower 31. Such offset provides the necessary balancing of the mower 31, weightwise, because of the extra weight exerted downwardly on the mower 31 and by the gear box 168 and the connections thereto as described. Still further, as seen in FIGS. 2, 10, and 11, the linkage 57 connects between the respective ends of the center mower 31 and the respective wing mowers 29 and 30 to lift the center mower 31 and to prevent the slidable telescoping splined shafts 178 and 179 from pulling away or apart relative to each other. This is true both during mowing, when the wing mower end plate 63 may be swung away from center mower 31, either during mowing, or in the raised transport position.

Also, the drive to the wing mowers 29 and 30, and the pivot for them, by pivot arms 44, are arranged so that the resistance of the mowers against the ground would tend to pivot the arms 44 rearwardly of the tractor 10. Taking this into consideration, the spring 54 is then disposed to also urge the arm 44 rearwardly, so there is no play or clearance, at least during mowing, relative to the horizontal positioning of the wing mowers 29 and 30.

With regard to the sharpening action of the mowers, FIGS. 1, 4, and 5, particularly show the drive to the mowers for reversing rotation of the mower reels 67 so that the lapping action can be performed in the sharpening function, as the reel blades 97 rotate in reverse against the bed knife surface 94. FIG. 1 shows the engine shaft 26 and a cover plate 187 over the end of the sprocket housing 24. Also, a stub shaft 188 extends rearwardly from a clutch housing 189 suitably mounted on the tractor. FIG. 5 shows a pressure type clutch 190 which is slidably splined on the tractor drive shaft 23. Shaft 23 has sprocket 191 driven by chain 192 driven by sprocket 193 on engine shaft 26. A clutch control arm 194 is suitably pivotally mounted on a shaft 196 on housing 189, and it controls the axial position of the clutch member 197 relative to the clutch plate 198 affixed to the shaft 23 for rotation thereof. Thus separation of the clutch members 197 and 198 will interrupt the drive to the stub or jack shaft 199 which carries the clutch member 197 and which is rotatable relative to the shaft 23. A gear 201 is affixed to shaft 199 to rotate therewith and to drive a gear 202 which is affixed to a stub shaft 188, rotatably mounted and supported by the housing 189, and a support cover 204 which is removably attached to the housing 189. A gear 206 is affixed to shaft 188 to rotate therewith and to drive a gear 207 rotatably affixed to mower drive shaft 136. In this drive train, the engine 11 then drives the shaft 136 in one direction of rotation for rotating the mower reels 67 in the forward direction of rotation. Also, the clutch 190 is available for interrupting the drive to the mowers, and a clutch control 208 is located on the tractor for the purpose of controlling the clutch 190, as described.

FIG. 5 also shows a sprocket 209 mounted on the stub shaft 188 for rotation therewith, and a chain 211 is on the sprocket 209 and extends up to a sprocket 212 which is on a shaft 213 rotatably supported in a bearing 214 held by arms 216 removably mounted on the housing 189 and housing cover 204. Shaft 213 connects to the engine shaft 26, when the cover 187 is removed from its FIG. 1 position, so shafts 26 and 213 rotate together to drive the sprockets engaged with the chain 211. At the time that the sprockets 209 and 212, along with shaft 213 and chain 211, are all mounted as shown in FIG. 5, then the clutch 190 would be dis-engaged so that the drive would go directly from the engine shaft 26 and to the stub shaft 188. This would then rotate the gears 202, 206, and 207 in a direction reverse from that heretofore mentioned, and therefore the drive shaft 136 would also rotate in the reverse direction. With the reverse direction of rotation of the drive shaft 136, the mower reels 67 are also rotated in the reverse direction for the lapping and self-sharpening action mentioned and desired.

Therefore, all of the mowers are positively driven in the forward mowing position, and they are also positively driven in the reverse direction when the lapping action is taking place. Further, all of the mowers are articularly mounted for adjusting to the ground, as the mowers rock or pivot about their respective mounting sleeves 32 and 47. Still further, the respective sleeves 32 and 47 are both affixed to cradle plates 217 spaced apart in the fore-and-aft direction of the mowers and each plate being respectively secured to the mower cross-tubes 64 and 66 so that the mowers are stable in the horizontal plane while at the same time they are articularly mounted, as mentioned.

The drive train to the mowers, as described and as shown in FIGS. 1, 4, and 5 particularly, provides a transmission operative between the engine and the mowers, and a reversing mechanism is provided in this drive train or transmission, for the sharpening or lapping of the mowers. Also, just as the reel springs are available for permitting displacement of the reels when they strike debris, the springs are available for controlling the position of the reel during the lapping process so that the reel blades will be snugly disposed in sliding contact with the bed knife surface as the reels are rotated in reverse direction. Of course it will also be understood, since it is conventional and common knowledge to one skilled in the art, that the rotation of shaft 23, while it may be constant in its drive of the hydraulic unit 32, there would be a control for governing the unit 22 and thereby governing the drive to the traction wheels 16.

In the spring-mounted reels, the bearings 102 and 124 are conical bearings having inner races 217' and 217", on reel shafts 98 and 122, and outer races 218 and 218' affixed with the respective bearing housings 103 and 123. The reel springs 119 yieldingly urge the reels in the direction of spiral action, and in the direction of force between the bevel gears 104, which direction of force is along the reel shaft 98 and to the right, as viewed in FIG. 8, to urge shaft 98 rightward in bearing 102 to the limit permitted by gear 104 and bearing race 217, to snug the bearings and to protect the mower and the gears 104.

What is claimed is:

1. In a gang lawn mower of the type including a tractor with a prime mover and traction wheels and a drive means operatively connecting said prime mover and said traction wheels for mobilizing said tractor, a plurality of arms pivotally mounted on said tractors and extending therefrom, a reel type of lawn mower pivotally mounted on the extending end of each of said arms and including a rotatable reel, said arms and said mowers both being arranged for positioning said mowers in a mowing position and in a transport position, the improvement comprising each of said arms and each of said mowers being separately and independently supported for separate and independent pivotal action, and a mechanical drive extending from said prime mover to each of said mowers for driving all of said mowers at the same cutting speed, said mechanical drive being flexible to the full extent of the pivotal motion of said mowers from said mowing position to said transport position, said drive means and said mechanical drive being operatively interconnected for mobilizing said tractor and driving said mowers at proportional speeds.

2. The gang lawn mower as claimed in claim 1, wherein said mechanical drive includes drive extension means for increasing the length of said mechanical drive to each of said mowers and thereby accommodate the pivotal action of each of said mowers, and limit means included in said gang lawn mower for limiting the length extension of said drive extension means.

3. The gang lawn mower as claimed in claim 2, wherein said mechanical drive includes two spline shafts joined together at one end of each of said shafts, a universal joint on the other end of each of said shafts for providing the flexibility of said mechanical drive.

4. The gang lawn mower as claimed in claim 3, wherein said mechanical drive includes bevel gears supported on said lawn mower and being drivingly connected intermediate said mower and the one of said universal joints which is disposed in said mechanical drive in the operative position adjacent said mower, bevel gears being on the axis of said mower reel, and with the other of said universal joints being on said tractor at an elevation substantially the same as said one universal joint and within the height of said reel when the latter is on the ground level with the ground on which said traction wheels are being supported, so said spline shafts pivot up and down about said other universal joint and through a minimum angle in response to up-and-down pivot of said mower relative to said tractor.

5. The gang lawn mower as claimed in claim 1, including abutment surfaces on said mowers and said arms and disposed for mutual engagement of said abutment surfaces upon pivotal motion of said mowers on said arms to limit said pivotal motion of said mowers relative to said arms, and latches on said tractor and engageable with said arms for releasably securing said arms in said transport position.

6. The gang lawn mower as claimed in claim 5, wherein said mechanical drive includes two spline shafts operatively connected with each of said mowers and arranged for extension and contraction in overall length and with said abutment surfaces being located to limit the extension of said spline shafts.

7. The gang lawn mower as claimed in claim 1, wherein two of said mowers are disposed side-by-side with the axes of said reels aligned, and an extendable and contractable connector attached between said two mowers for limiting the relative pivotal motion between said two mowers.

8. The gang lawn mower as claimed in claim 7, wherein said mechanical drive includes two spline shafts operatively connected to said two mowers and arranged for extension and contraction in overall length of said spline shafts betwen said two mowers and with the extension of said spline shafts being limited by said connector.

9. The gang lawn mower as claimed in claim 7, wherein said connector has one end attached to one of said two mowers and moves upwardly therewith in the lifting of said one mower to the transport position, and said connector includes limit means effective in the extension of said connector in the raising of said one end, for transmitting the lifting force on said one mower to the other of said mowers for simultaneously lifting both said mowers to the transport position.

10. The gang lawn mower as claimed in claim 1, wherein said arms are pivotal on said tractor to extend laterally of the fore-and-aft axis of said tractor, and lift springs connected between said arms and said tractor and being arranged to exert a lifting force on said arm at a location rearwardly of an upright plane along said arms, for also urging said arm toward the rearward direction of said tractor to minimize any play in the joint of the pivot connection of said arm on said tractor and relative to the forward direction of said tractor and the direction of mowing.

11. The gang lawn mower as claimed in claim 1, wherein said arms are pivotally mounted on said tractor on pivot axes extending in the direction of the fore-and-aft axis of said tractor, a shaft connected to the extending end of each of said arms and with said shafts extending in said fore-and-aft direction, each of said mowers having a sleeve affixed thereto at spaced-apart locations along said fore-and-aft direction pivotally telescopically receiving each of said shafts, ground skids on the opposite ends of each of said mowers, said sleeves on said mowers being positioned off center relative to the longitudinal axis of said mowers for end-to-end weight-balancing of said mowers on said shafts.

References Cited

UNITED STATES PATENTS

| | | | |
|---|---|---|---|
| 2,909,882 | 10/1959 | Lewis | 56—7 |
| 3,058,281 | 10/1962 | Lewis | 56—7 |
| 3,410,063 | 11/1968 | Speiser | 56—7 |
| 3,472,005 | 10/1969 | Profenna | 56—7 |
| 3,429,109 | 2/1969 | Heth et al. | 56—7 |

RUSSELL R. KINSEY, Primary Examiner